July 3, 1928.
F. E. BANCROFT
1,676,002
VARIABLE CAPACITY ELECTRICAL CONDENSER
Filed Oct. 18, 1926
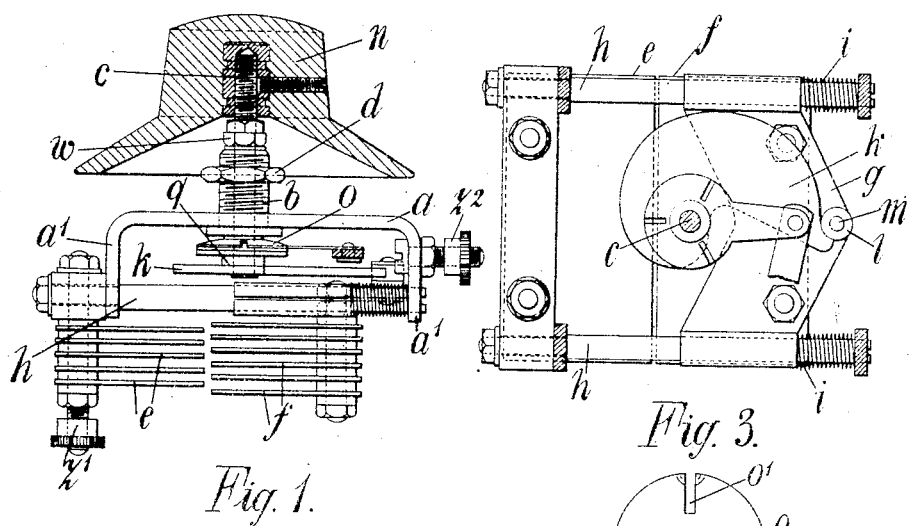
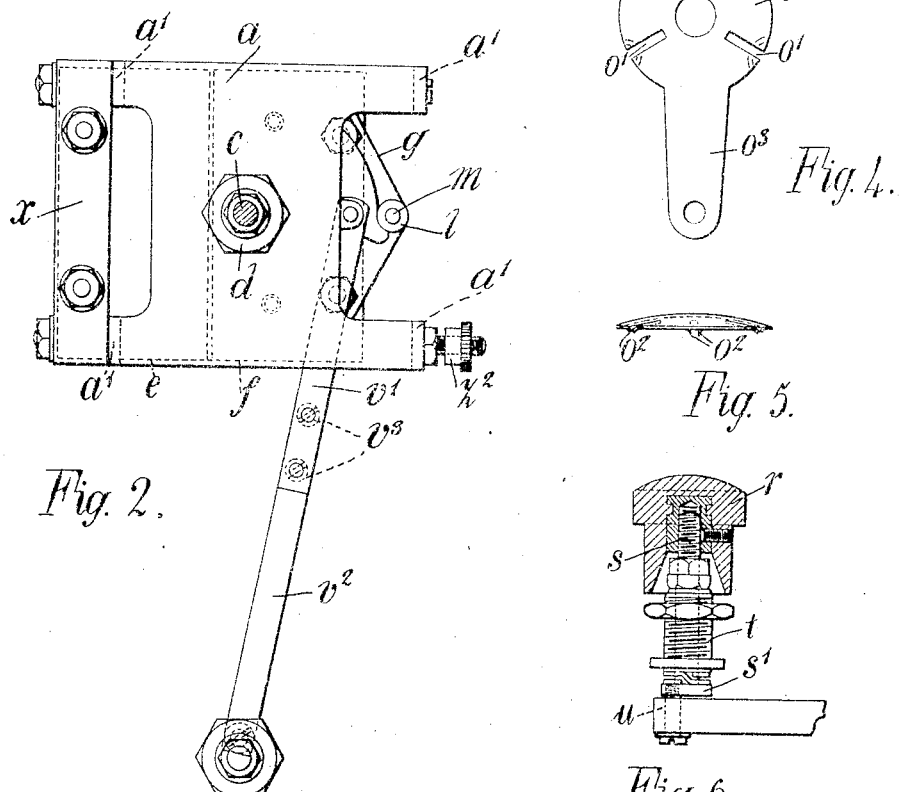

Patented July 3, 1928.

1,676,002

UNITED STATES PATENT OFFICE.

FRANK EDMUND BANCROFT, OF LONGSIGHT, MANCHESTER, ENGLAND, ASSIGNOR TO RIPAULTS, LIMITED, OF LONDON, ENGLAND.

VARIABLE-CAPACITY ELECTRICAL CONDENSER.

Application filed October 18, 1926, Serial No. 142,466, and in Great Britain October 22, 1925.

This invention relates to variable capacity electrical condensers and is particularly though not solely applicable to such condensers as used for tuning sets in connection with wireless apparatus. As is well known it is desirable that such condensers should be constructed in a manner which will enable the scale or dial readings to be proportional to the wave length or frequency which necessitates providing means for causing the capacity variations and dial readings to be connected by some law other than a straight line law. This is usually effected by making the condenser vanes or plates of some special shape so that for equal increments of scale or dial readings the intermeshing or active area of the vanes or plates is caused to increase in proportion to the square (or other desired function) of the dial readings.

The present invention has for its object to devise means for enabling capacity variations to be obtained which are proportional to any desired function of dial or scale readings without the necessity for specially shaping the condenser vanes or plates (although in some cases the same may be specially shaped, if desired) and the invention consists in a variable electrical condenser of the kind embodying fixed and moving vanes or plates characterized by a cam or its equivalent interposed between the moving vanes or plates and the knob or other operative member for giving the desired movement to said movable vanes or plates so that the capacity variations shall bear some definite relation to the scale or dial readings, the actual relationship depending upon the shape of the cam or equivalent chosen or the shape of the plates.

The invention also consists in a variable electrical condenser according to the preceding paragraph having means for providing for fine adjustment of the cam or equivalent so as to obtain fine adjustments of capacity at any point between maximum and minimum values.

The invention also consists in other details and arrangements hereinafter described or indicated.

The accompanying drawings illustrate one convenient mode of carrying out the invention.

Figure 1 shows in part sectional elevation one form of condenser in accordance with the invention.

Figure 2 is a plan view of Figure 1 with a part removed.

Figure 3 is a further plan view with a further part removed.

Figures 4 and 5 are respectively a plan and an elevation on a somewhat larger scale of a part shown in Figures 1 and 3, and Figure 6 is a fragmentary view in part sectional elevation showing a detail in connection with the fine adjustment.

In carrying my invention into effect in one convenient manner I form my improved variable capacity condenser with a frame plate $a$ punched out of sheet metal or otherwise suitably formed and having a hole punched or formed therein to take the bush $b$, the plate also being formed with four projections which are adapted to be bent downwards as shown at $a'$.

The threaded bush $b$ is secured in the frame plate by soldering, ring punching or the like, and serves both as a bearing for the spindle $c$ and also as a means for fixing the condenser to a panel or other support by means of a nut $d$.

The condenser as is usual is provided with two sets of vanes or plates, one set of fixed vanes $e$ and a set of movable vanes $f$, but in place of forming the vanes of special shape these may be made of rectangular form as shown in the plan views and in order that the proper relationship may be obtained between the dial or scale readings and capacity variations I introduce a cam or its equivalent of suitable form between the movable plates and the knob or other operative member for moving the same. Thus in the particular construction illustrated the movable plates are carried upon a frame member $g$ which is mounted upon slide rods, ball bearing runners or other suitable guides $h$ carried upon the frame plate $a$, the movement of the movable vanes being controlled by springs $i$ and an appropriately shaped cam $k$ adapted to engage a leather or other washer or roller $l$ upon a driving pin $m$ secured upon the sliding member $g$, or the springs may be dispensed with and the cam arranged to move the plates positively in both directions. When springs are employed as shown, I may employ an additional spring acting upon the cam spindle to balance the pressure of the first-mentioned springs.

The cam $k$ is riveted or otherwise secured upon the lower end of the spindle $c$, the upper end of which carries a combined knob and dial $n$, and the arrangement is such that as the knob $n$ is rotated the cam $k$ permits movement of the movable vanes relative to the fixed vanes, such movement being that required to give any desired relationship between the scale or dial readings and capacity variations as determined by the particular shape or design of the cam employed.

It will be obvious that with such an arrangement not only is there a considerable simplification and saving of material in forming the vanes or plates but further the one condenser may be provided with a set of interchangeable cams or like members so that variations may be introduced into the relationship between the dial readings and the capacity variations depending upon the purpose for which the condenser is to be employed or any practical requirements which may have to be fulfilled.

In some cases I may employ a uniform motion cam combined with plates of an appropriate shape in order to secure the desired variations of capacity, or the plates may be rectangular in shape but of graded lengths.

Furthermore, any condenser in accordance with the invention may be furnished with a plurality of cams on the one spindle and means provided to enable any cam to be selected for operation.

In connection with such improved condenser I prefer to provide means for obtaining a fine adjustment of capacity at any point between the minimum and maximum limits, and I also prefer that such fine adjustment should be operable by means situated somewhat remote from the condenser so that variations in capacity may not be introduced by the too close proximity of the operator's hand to the condenser. For this purpose I provide any suitable friction clutch or like arrangement which will permit free movement of the cam due to movement of the knob and dial and which will also enable the cam to be moved from the fine adjustment means provided. In the construction shown the friction clutch is arranged upon the spindle $c$ just above the cam $k$ and consists of a spring washer $o$ (Figures 4 and 5) having slots $o'$ formed therein with the ends of the slots turned down as at $o^2$ so as to form tongues adapted to engage a friction washer $p$ of cork, leather or other suitable material positioned by means of a metal washer $q$ secured upon the spindle between the friction washer and cam $k$.

To enable the friction clutch to be operated by fine adjustment means the washer $o$ is formed with an extension $o^3$ which is adapted to act as a turning lever and to which is pivotally secured an arm or link adapted to be actuated by means of a crank or the like from the fine adjustment knob or other operative member $r$ (Figure 6).

In the particular example illustrated the fine adjustment knob is secured upon a spindle $s$ carried by a bush $t$ (which may be fitted to the same panel or support as that which carries the condenser), the spindle $s$ having a flange $s'$ at its lower end which with the pin $u$ forms a crank by means of which the arm secured to the lever $o^3$ may be operated, the arm in the particular example illustrated comprising a metal portion $v'$ pivoted to the lever-like extension $o^3$ and an ebonite or other insulating portion $v^2$ carrying the crank pin $u$ and secured to the portion $v'$ by screws $v^3$ or otherwise.

A standard spring washer with leather washers or the like may be provided for the purpose of giving the necessary friction to the spindle $s$ and in connection with the main spindle $c$ leather washers or the like may be placed between the spring washer $o$ and the bush and also between the bush and lock nuts $w$ in order to give smooth working. Definite stops for the knob and dial $n$ may be provided at minimum and maximum capacity by means of stop pins or by so shaping the cam $k$ that it is stopped at these points against the sliding member $g$. The fixed and moving vanes or plates may be spaced apart to give the necessary air space by any suitable jigs or otherwise and they are held in their spaced positions by means of suitable washers or spacing devices, the fixed plates being conveniently carried from an insulating block $x$ secured upon the frame plate $a$, the block being capable of slight vertical adjustment upon the reduced ends of the guide rods $h$ in order to provide for the proper positioning of the fixed and moving plates relative to one another.

The electrical connections to the fixed and moving plates may be provided for by suitable terminals $z'$ and $z^2$ respectively, either or both of the springs $i$ being soldered to the frame at one end and to the slide plates $g$ at the other end to ensure positive electrical connection.

In an alternative arrangement for securing fine adjustment, I may secure a spur wheel upon the cam spindle to drive the cam, such spur wheel meshing with a pinion attached to an operating spindle at one side of the condenser. The cam spindle carries the dial on its outer end and is preferably freely mounted without any friction device thereon, a small amount of friction being arranged for on the pinion shaft. This arrangement prevents backlash in the gearing owing to the slide spring tending always to maintain the pinion and spur wheel in mesh.

It will however be understood that the foregoing details of construction are given purely by way of illustration and not of limitation since the invention extends broadly to the employment of a cam for imparting the necessary movement from the knob or dial or other operative member to the moving plates or vanes, and I may either provide for a rectilinear movement of the plates or vanes as in the example illustrated or such movement may be of a rotary character, and I may vary the form and arrangement of cam or the like that is adopted, the means provided for securing fine adjustment when this is desired and the manner of securing electrical connection to the respective sets of vanes or plates depending upon the character of condenser required or the purpose for which the same is to be employed.

Having now described my invention, what I claim as new and desire to secure by Letters Patent is:—

1. A variable electrical condenser comprising a set of fixed plates of substantially rectangular shape and a set of movable plates slidably mounted upon supports parallel to one pair of sides of said fixed set of plates, a plurality of springs tending to move said second set of plates relatively to the fixed set, a rotatable spindle carrying a knob and a cam, said cam being adapted to control the movements of the second set of plates.

2. A variable electrical condenser comprising a set of fixed plates two of whose sides are parallel, a second set of plates attached to sleeve members, guide rods parallel to said sides and along which said sleeve members are adapted to slide, a cam member rotatably mounted on a spindle and adapted to cause movement of the second set of plates along said guide rods.

3. A variable electrical condenser comprising a set of fixed plates two of whose sides are parallel, guide rods parallel to said sides, a frame member having sleeves movable along said rods, a second set of plates mounted on said frame member, a roller member on said frame member adapted to coact with a cam rotatably mounted on a spindle.

4. A variable electrical condenser comprising a set of fixed plates two of whose sides are parallel, a second set of plates, a frame member supporting said second set and slidably mounted upon guide rods parallel to said sides, springs on said guide rods tending to move said frame member, a projection on said frame member adapted to coact with a cam mounted on a rotatable spindle.

5. A variable electrical condenser comprising a set of plates two of whose sides are parallel, guide rods parallel to said sides, a frame member slidably mounted on said guide rods, a second set of plates mounted on said frame member, a projection on said frame member adapted to coact with a cam rotatably mounted on a spindle, a lever on said spindle and frictionally coupled thereto, and means to move said lever in either direction about a mean position.

6. A variable electrical condenser according to claim 1 having a lever frictionally engaged with said spindle, a crank adapted to move said lever in either direction about its mean position, and a knob adapted to rotate said crank.

7. A variable electrical condenser according to claim 1 having a lever frictionally mounted on said spindle, an arm attached at one end to said lever, a crank attached to the other end of said arm, and means to rotate said crank.

8. A variable electrical condenser according to claim 5 having an extended arm attached to said lever, a crank attached to said arm at its end opposite from said lever, and a knob to rotate said crank.

In testimony whereof I have signed my name to this specification.

FRANK EDMUND BANCROFT.